(12) United States Patent
Horiyama

(10) Patent No.: US 12,075,010 B2
(45) Date of Patent: Aug. 27, 2024

(54) PRINTING APPARATUS, STORAGE MEDIUM STORING PROGRAM, AND DATA GENERATION METHOD, THAT PROVIDE DATA ASSOCIATING CONSUMPTION INFORMATION AND ACCEPTED USER SCENE

(71) Applicant: CANON KABUSHIKI KAISHA, Tokyo (JP)

(72) Inventor: Jun Horiyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/449,819

(22) Filed: Aug. 15, 2023

(65) Prior Publication Data
US 2024/0073334 A1     Feb. 29, 2024

(30) Foreign Application Priority Data
Aug. 29, 2022  (JP) .................... 2022-136235

(51) Int. Cl.
*H04N 1/00* (2006.01)

(52) U.S. Cl.
CPC ..... *H04N 1/00503* (2013.01); *H04N 1/00427* (2013.01); *H04N 1/00482* (2013.01)

(58) Field of Classification Search
None
See application file for complete search history.

(56) References Cited

U.S. PATENT DOCUMENTS

| | | | | |
|---|---|---|---|---|
| 2008/0186530 A1* | 8/2008 | Kurozasa | ............ | G06F 3/1288 358/1.15 |
| 2011/0188073 A1* | 8/2011 | Akutsu | ............ | H04N 1/00832 358/1.15 |
| 2012/0099143 A1* | 4/2012 | Sasagawa | ............ | G06F 21/608 358/1.15 |
| 2014/0240748 A1* | 8/2014 | Ohno | ............ | G03G 21/02 358/1.14 |
| 2017/0001454 A1* | 1/2017 | Ito | ............ | B41J 29/13 |
| 2021/0084191 A1* | 3/2021 | Ogawa | ............ | H04N 1/00474 |
| 2024/0056534 A1* | 2/2024 | Shirai | ............ | H04N 1/00413 |
| 2024/0080396 A1* | 3/2024 | Shimada | ............ | H04N 1/00427 |

FOREIGN PATENT DOCUMENTS

JP        2019149680 A      9/2019

\* cited by examiner

*Primary Examiner* — Henok Shiferaw
(74) *Attorney, Agent, or Firm* — ROSSI, KIMMS & McDOWELL LLP

(57) ABSTRACT

A printing apparatus comprising: at least one memory and at least one processor which function as: a printing unit configured to print on a print medium; an acceptance unit configured to selectively accept a use scene of the apparatus; an obtaining unit configured to obtain consumption information of a consumable when the printing unit printed; and a generation unit configured to generate data in which the use scene accepted by the acceptance unit and the consumption information obtained by the obtaining unit are associated.

14 Claims, 12 Drawing Sheets

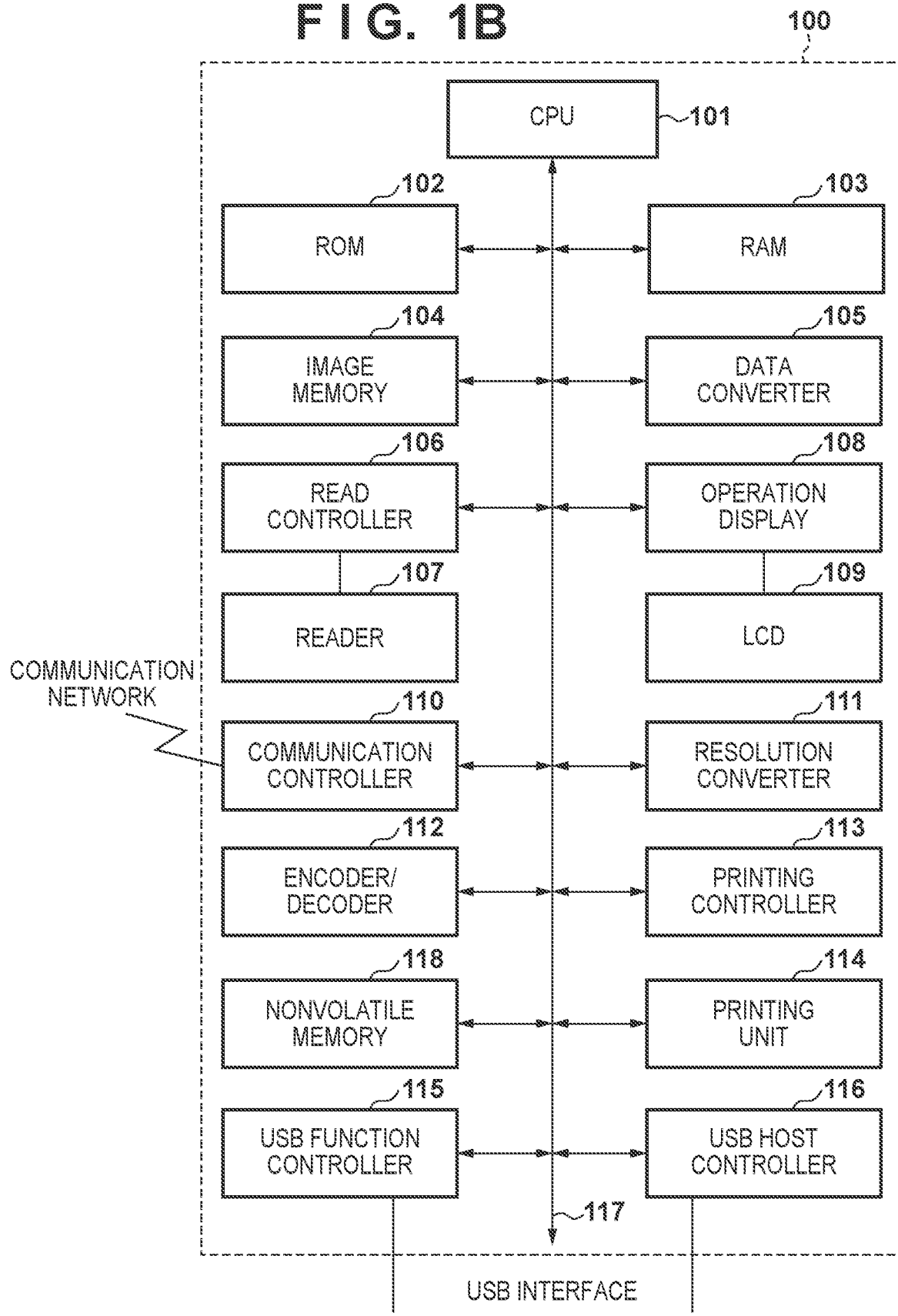

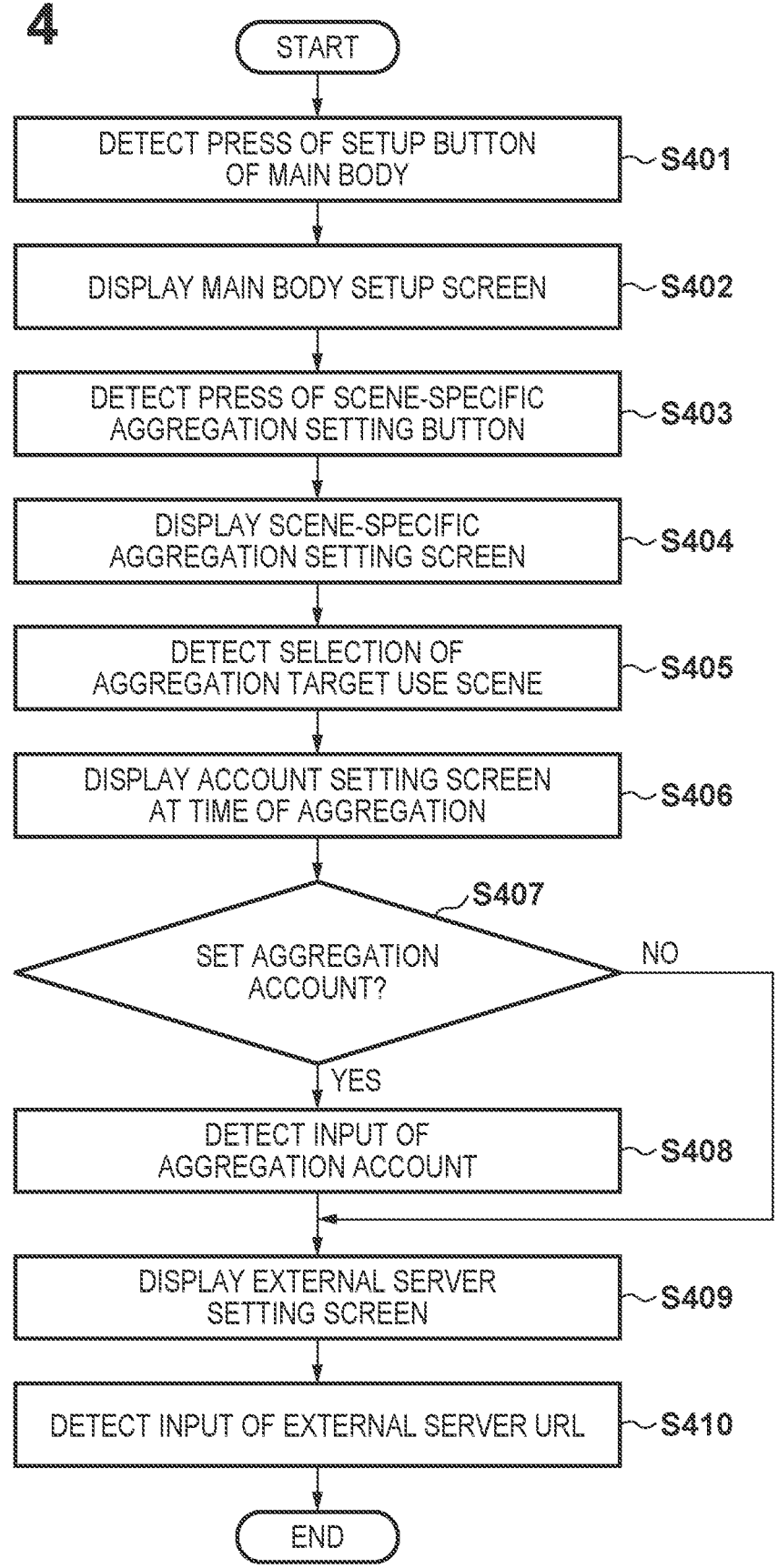

FIG. 6

| SCENE | STANDARD | WORK | STUDY | LIFE |
|---|---|---|---|---|
| TAB | 0 | 1 | 2 | 3 |
| AGGREGATION SETTING | NOT DO | DO | NOT DO | NOT DO |
| AGGREGATION ACCOUNT | — | Yamada | — | — |
| EXTERNAL SERVER | — | aaa@cloud.com/aaa | — | — |

FIG. 8

| PRINT TIME AND DATE | ACCOUNT NAME | SCENE NAME | NUMBER OF PRINT SHEETS | PAPER SIZE | COLOR/ MONOCHROME |
|---|---|---|---|---|---|
| 2022/4/19 18:48 | Yamada | WORK | 3 | A4 | MONOCHROME |

FIG. 10A

| ID | PRINT TIME AND DATE | ACCOUNT NAME | SCENE NAME | NUMBER OF PRINT SHEETS | PAPER SIZE | COLOR / MONOCHROME |
|---|---|---|---|---|---|---|
| 11 | 2022/4/19 18:48 | Yamada | WORK | 3 | A4 | MONOCHROME |
| 12 | 2022/4/20 10:35 | Tanaka | WORK | 10 | A4 | MONOCHROME |
| 13 | 2022/4/20 13:35 | Yamada | WORK | 15 | A4 | MONOCHROME |
| 14 | 2022/4/21 19:20 | Sato | WORK | 2 | A4 | MONOCHROME |
| 15 | 2022/4/22 9:10 | Tanaka | WORK | 4 | A3 | COLOR |

FIG. 10B

| ID | ACCOUNT NAME | SCENE NAME | NUMBER OF PRINT SHEETS | PAPER SIZE | COLOR / MONOCHROME |
|---|---|---|---|---|---|
| 21 | Yamada | WORK | 18 | A4 | MONOCHROME |
| 23 | Tanaka | WORK | 10 | A4 | MONOCHROME |
| 24 | Tanaka | WORK | 4 | A3 | COLOR |
| 22 | Sato | WORK | 2 | A4 | MONOCHROME |

PRINTING APPARATUS, STORAGE MEDIUM STORING PROGRAM, AND DATA GENERATION METHOD, THAT PROVIDE DATA ASSOCIATING CONSUMPTION INFORMATION AND ACCEPTED USER SCENE

BACKGROUND OF THE INVENTION

Field of the Invention

The present invention relates to a printing apparatus, a storage medium storing a program, and a data generation method.

Description of the Related Art

In various use scenes of printing apparatuses, it is sometimes necessary to accurately count up the number of print sheets. An assumed example is a case where the number of print sheets is used to grasp the use status of a printing apparatus or charge a user. At this time, there is proposed a technique capable of, only when an image a user wants is printed, counting up the number of print sheets and properly grasping the use status of the printing apparatus or charging the user (see, for example, Japanese Patent Laid-Open No. 2019-149680).

SUMMARY OF THE INVENTION

The present invention provides a technique of more properly grasping the use status of a printing apparatus.

The present invention in one aspect provides a printing apparatus comprising: at least one memory and at least one processor which function as: a printing unit configured to print on a print medium; an acceptance unit configured to selectively accept a use scene of the apparatus; an obtaining unit configured to obtain consumption information of a consumable when the printing unit printed; and, a generation unit configured to generate data in which the use scene accepted by the acceptance unit and the consumption information obtained by the obtaining unit are associated.

According to the present invention, the use status of a printing apparatus can be grasped more properly.

Further features of the present invention will become apparent from the following description of exemplary embodiments (with reference to the attached drawings).

BRIEF DESCRIPTION OF THE DRAWINGS

FIG. 1B is a block diagram showing an example of the configuration of an MFP 100;

FIG. 4 is a flowchart showing an example of processing of a CPU;

FIG. 6 is a table showing an example of scene-specific aggregation setting data;

FIG. 8 is a table showing an example of transmission data to be transmitted to the external server;

FIGS. 10A and 10B are tables each showing an example of presentation of aggregation data.

DESCRIPTION OF THE EMBODIMENTS

Figure 1A:
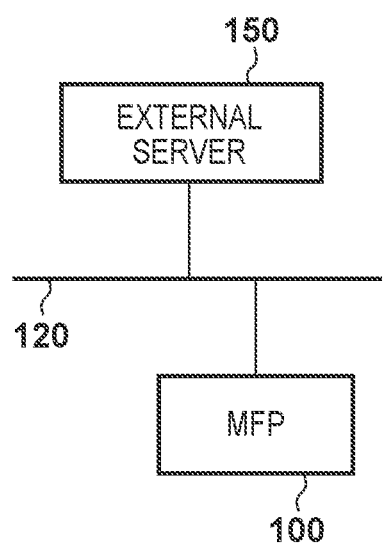
FIG. 1A is a block diagram showing an example of a network configuration according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Recently, one printing apparatus is used at home in a plurality of use scenes such as work scene and home scene along with the spread of telework. However, when the number of print sheets is counted in the printing apparatus used in a plurality of use scenes, count results in the respective scenes coexist and the use status of the printing apparatus may not be grasped properly.

According to the present disclosure, the use status of the printing apparatus can be grasped more properly.

First Embodiment

<Network Configuration Diagram (FIG. 1A)>

FIG. 1A is a block diagram showing an example of a network configuration according to the embodiment. A Multifunction Peripheral (MFP) 100 that processes a print job and transmits aggregation data, and an external server 150 that receives the aggregation data transmitted from the MFP 100 are connected to an external network 120. The numbers of connected external servers 150 and MFPs 100 are not limited to this. Note that the aggregation data transmission destination is the external server 150 in the embodiment, but may be a server other than the external server or a Personal Computer (PC) (for example, a server or a PC in a local area network (LAN) network).

<Block Diagrams (FIGS. 1B and 1C)>

FIG. 1B is a block diagram showing an example of the configuration of the MFP 100 according to the embodiment. The MFP 100 is an example of a printing apparatus. Also, the MFP 100 is an example of an information processing apparatus. The MFP 100 is an example of an electronic device. The MFP 100 according to the embodiment has information processing functions such as generation, storage, and transmission of device information including log information and status information.

The MFP 100 includes a Central Processing Unit (CPU) 101, a Read Only Memory (ROM) 102, a Random Access Memory (RAM) 103, an image memory 104, a data converter 105, a read controller 106, a reader 107, an operation display 108, a liquid crystal display (LCD) 109, a communication controller 110, and a resolution converter 111. Further, the MFP 100 includes an encoder/decoder 112, a printing controller 113, a printing unit 114, a Universal Serial Bus (USB) function controller 115, a USB host controller 116, a bus 117, and a nonvolatile memory 118.

The CPU 101 is a system controller and controls the overall MFP 100. The ROM 102 is a nonvolatile memory that stores control programs to be executed by the CPU 101, data tables, and permanent data such as a built-in operating system (OS). That is, in the embodiment, various functions of the MFP 100 can be executed by concretely implementing, by the CPU 101 serving as an example of hardware, information processing based on software stored in the ROM 102. In the embodiment, each control program stored in the ROM 102 performs software execution control such as scheduling, task switching, or interrupt processing under the management of the built-in OS stored in the ROM 102. The ROM 102 stores information representing a permission state representing whether to provide device information to the outside. The RAM 103 is constituted by a Static Random Access Memory (SRAM) or the like requiring a backup power supply, and power feeding to the RAM 103 is guaranteed by a data backup primary battery (not shown). The RAM 103 stores program control variables and the like.

The image memory 104 is constituted by a Dynamic Random Access Memory (DRAM) or the like and can accumulate image data. The area of part of the image memory 104 is ensured as a work area for executing software processing. The data converter 105 can perform conversion of image data such as analysis of a Page Description Language (PDL) or Computer Graphics (CG) rendering of character data.

The reader 107 optically reads a document by a Contact Image Sensor (CIS) and converts it into an electrical image signal. The read controller 106 performs various image processes such as binarization processing and halftone processing on the image signal, and outputs high-resolution image data. Note that the method of optically reading a document can be either of a sheet read control method of reading a document by a fixed CIS image sensor, and a book read control method of reading a document fixed on a document table by a moving CIS image sensor.

The operation display 108 is constituted by minimum keys such as numerical input keys, a mode setting key, an OK key, and a cancel key, a Light Emitting Diode (LED), and a 7-segment display portion. These keys are implemented by so-called soft keys displayed on the LCD 109 and can accept an operation from a user. When no user operation is performed in a predetermined time, the backlight of the LCD 109 is switched off to reduce the power consumption. The CPU 101 performs display control of the operation display 108.

The communication controller 110 controls communication between the MFP 100 and a communication network, and performs connection to an Internet service provider and communication of various data between the MFP 100 and the external server 150. The communication controller 110 can determine whether the MFP 100 is connected to the Internet or only to a LAN. Note that the connection between the communication controller 110 and the communication network can use a known method such as Hypertext Transfer Protocol (HTTP) or Extensible Messaging and Presence Protocol (XMPP).

The resolution converter 111 performs resolution conversion processing such as mutual conversion between mm-image data and inch-image data. Note that the resolution converter 111 can execute even scaling processing of image data. The encoder/decoder 112 performs encoding/decoding processing and scaling processing on image data (non-compression, MH, MR, MMR, JBIG, or JPEG) handled by the MFP 100.

The printing controller 113 performs various image processes such as smoothing processing, print density correction processing, and color correction on image data to be printed, thereby converting the image data into high-resolution image data and outputting it to the printing unit 114. The printing controller 113 also has a function of periodically obtaining state information data of the printing unit 114. The printing controller 113 also has a function of obtaining aggregation data such as the number of print sheets and the printing date & time.

The printing unit 114 is constituted by a laser beam printer, an inkjet printer, or the like, and prints on a print medium such as a sheet based on image data generated by the printing controller 113.

The USB function controller 115 performs protocol control according to a USB communication standard. The USB host controller 116 is a controller for performing communication in accordance with a protocol defined by the USB communication standard. The USB communication standard is a standard for two-way high-speed data communication, and determines that a plurality of hubs or functions (slaves) can be connected to one host (master). That is, the USB host controller 116 provides the function of a host in USB communication.

The nonvolatile memory 118 stores data obtained from a network, settings of an information processing apparatus, aggregation data, and the like. The building components except the reader 107 and the LCD 109 are connected each other via the bus 117.

Figure 1C:
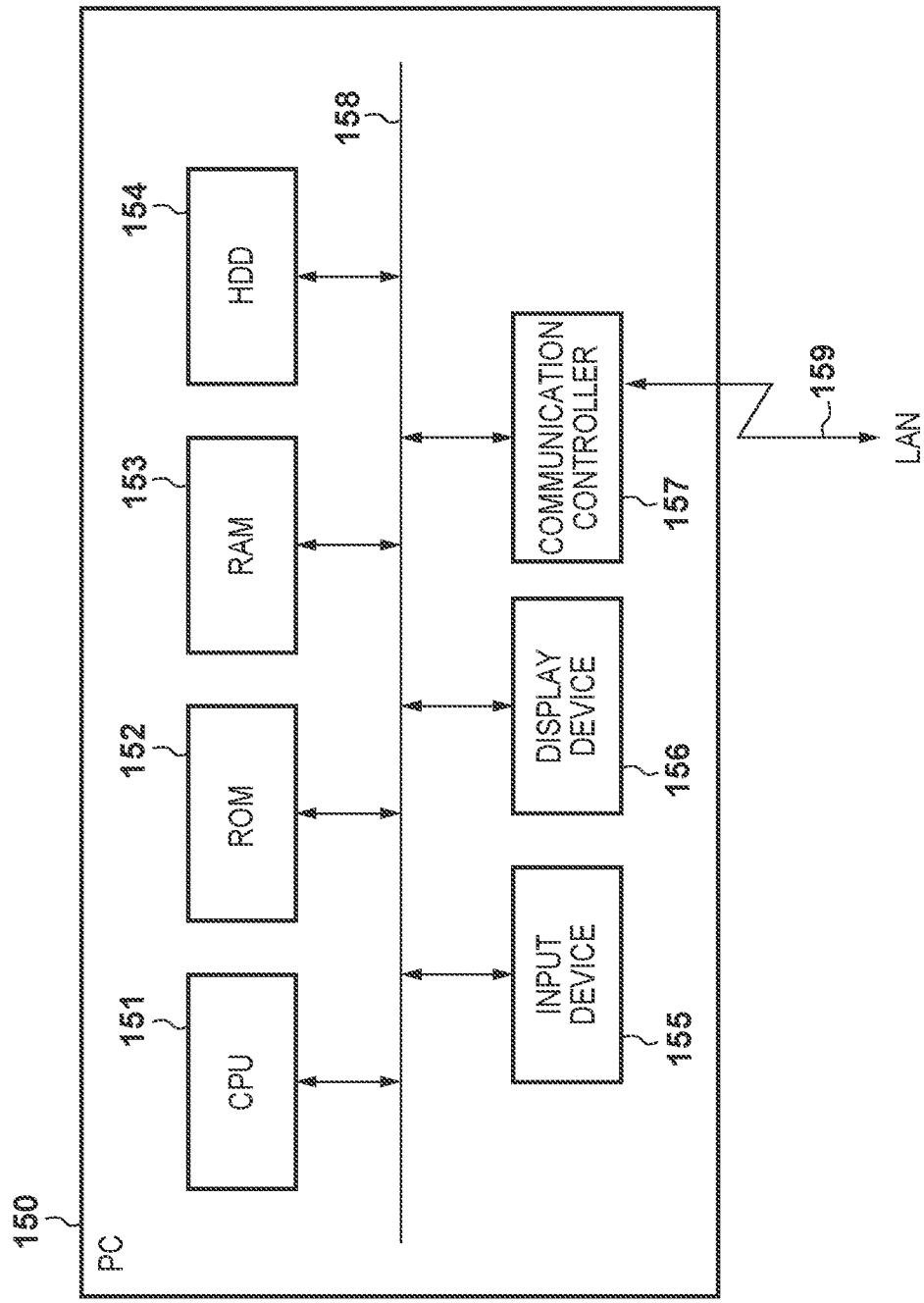
FIG. 1C is a block diagram showing an example of the configuration of an external server 150.

FIG. 1C is a block diagram showing an example of the configuration of the external server 150. In the external server 150, a CPU 151 controls the overall external server 150. A ROM 152 stores programs and data regarding each process. A RAM 153 is a system work memory for operating the CPU, and is a storage memory that stores temporary data regarding each process. A Hard Disk Drive (HDD) 154 stores programs, data, temporary data, and application data regarding each process, aggregation data transmitted from the MFP 100, and the like. An input device 155 includes a keyboard and a pointing device that accept an instruction input to the apparatus. A display device 156 displays the operation status of the apparatus and information output by each program running on the apparatus. A network OF 157 is connected to a network (LAN) 159, and performs input/output of information from/to another PC or image forming apparatus connected to the same LAN. These components are arranged on a system bus 158. In the embodiment, a function (or processing) by an operating system (OS) or an application is implemented by executing processing by the CPU 151 based on the OS stored in the HDD 154 or a program corresponding to the application.

<Operation Panel Views (FIGS. 2 to 3C)>

Figure 2:
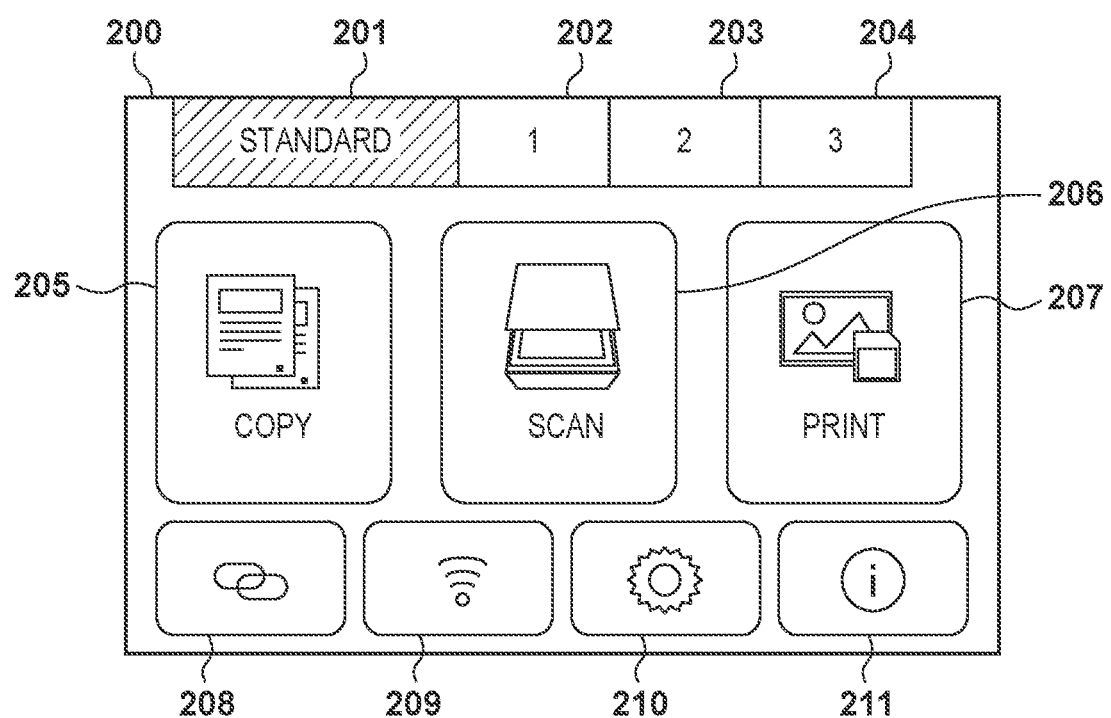
FIG. 2 is a view showing an example of a screen displayed on an operation display.

In the embodiment, the operation display 108 of the MFP 100 can display a screen of a tab form. FIG. 2 is a view showing an example of a screen displayed on the operation display 108, and is a view showing a standard home screen displayed on an operation panel 200 included in the operation display 108.

A tab 201 corresponds to the standard home screen. Tabs 202, 203, and 204 correspond to custom home screens, respectively. The user can press the tabs 201 to 204 to switch the home screen. The tabs 202 to 204 are a plurality of tabs corresponding to acceptable use scenes and are selectively displayed on the operation panel 200, details of which will be described later. For example, the color of the tab 201 can be changed from that of the remaining tabs to represent that the standard home screen is displayed. The standard home screen includes a copy menu button 205, a scan menu button 206, a print menu button 207, a LAN button 208, a wireless connect button 209, a setup button 210, and a hint button 211. These buttons correspond to respective menus, and the standard home screen changes to each menu by pressing a corresponding button by the user.

Figure 3A:
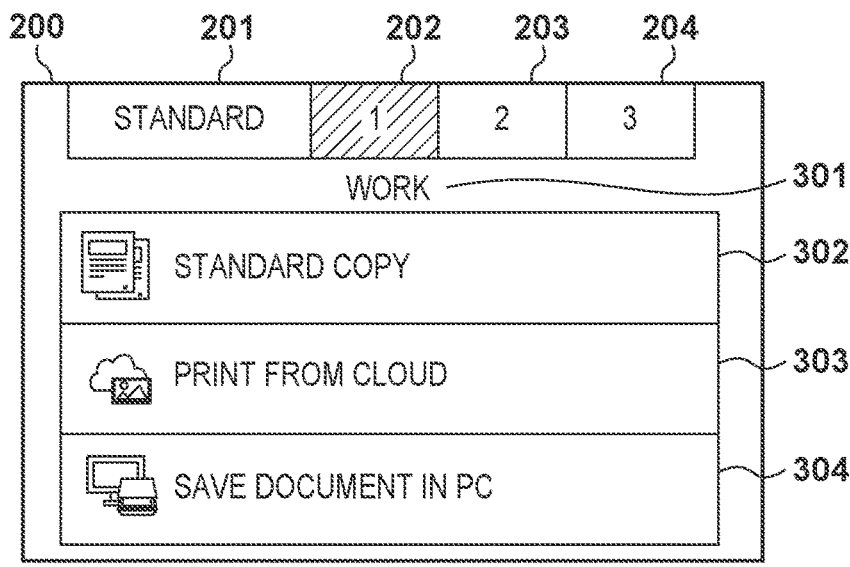
FIGS. 3A to 3C are views each showing an example of a screen displayed on the operation display.
Figure 3B:
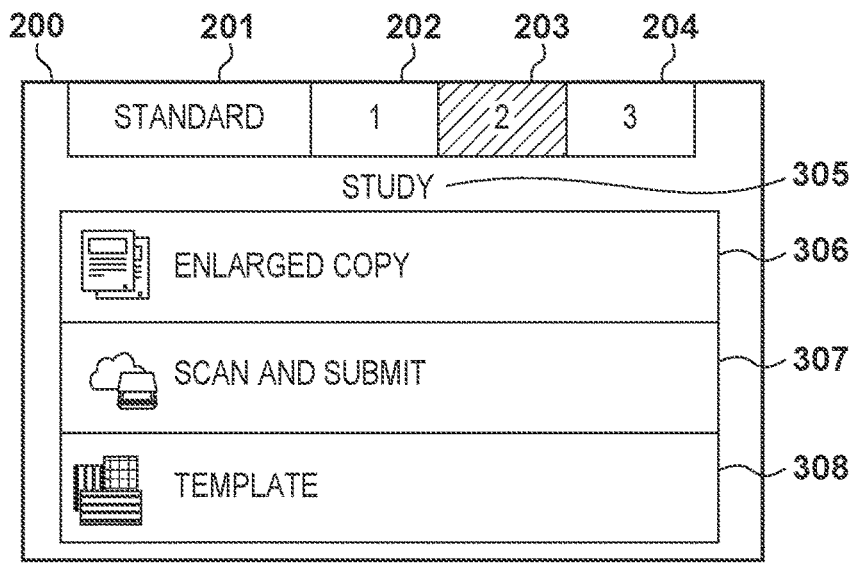
Figure 3C:
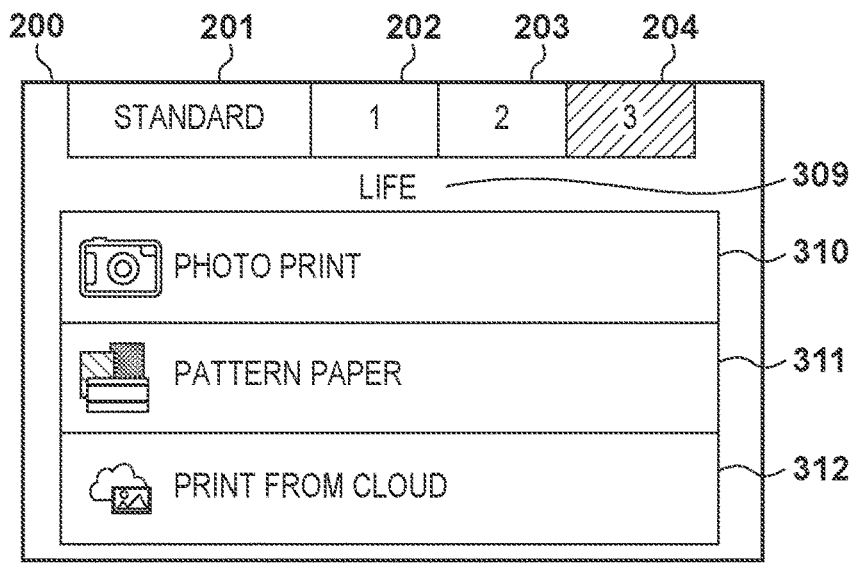

FIGS. 3A to 3C are views each showing an example of a screen displayed on the operation display 108, and views showing the custom home screens of the tabs 202 to 204 displayed on the operation panel 200. The color of a selected tab can be changed from that of the remaining tabs to represent which of the tabs 202 to 204 corresponds a displayed custom home screen. Use scene display areas 301, 305, and 309 display use scenes of the MFP 100. The use scene represents a scene in which a print material printed by the printing unit 114 based on a print instruction is used. Use scenes can be categorized in accordance with specific application purposes or users. Custom menus 302, 303, 304, 306, 307, 310, 311, and 312 are menus customizable by a user and can designate functions displayed at each menu position. That is, the custom menus 302, 303, 304, 306, 307, 310, 311, and 312 can be properly customized to display a different menu on the operation panel 200 for each tab (each use scene).

FIG. 3A shows a custom home screen on which menus frequently used in a work scene are arranged on the home screen. The use scene display area 301 displays a character string "WORK" representing that the custom home screen targets a work scene. The custom menu 302 is "standard copy", the custom menu 303 is "print from cloud", and the custom menu 304 is "save document in PC". The menus frequently used in the work scene are arranged.

FIG. 3B shows a custom home screen on which menus frequently used in a study scene are arranged on the home screen. The use scene display area 305 displays a character string "STUDY" representing that the custom home screen targets a study scene. The custom menu 306 is "enlarged copy", the custom menu 307 is "scan and submit", and a custom menu 308 is "template". The menus frequently used in the study scene are arranged.

FIG. 3C shows a custom home screen on which menus frequently used in a life scene are arranged on the home screen. The use scene display area 309 displays a character string "LIFE" representing that the custom home screen targets a life scene. The custom menu 310 is "photo print", the custom menu 311 is "pattern paper", and the custom menu 312 is "print from cloud". The menus frequently used in the life scene are arranged.

<Grasping of Use Status for Each Use Scene>

An image forming apparatus such as the MFP 100 sometimes counts (aggregates) the number of print sheets to grasp the use status of the apparatus. However, as described above, when the number of print sheets is counted in an apparatus capable of selecting a plurality of use scenes, count results in the respective scenes coexist and the use status of the apparatus may not be grasped properly. To solve this, according to the embodiment, aggregation of a print result is performed in accordance with a use scene by the following processing. This will be explained in detail below.

<Scene-Specific Aggregation Setting Sequence (FIGS. 4 to 5D)>

FIG. 4 is a flowchart showing an example of processing of the CPU 101 for explaining a method of aggregation setting for each use scene. FIGS. 5A to 5D are views showing examples of a screen displayed on the operation display 108 and show examples of a screen regarding scene-specific aggregation setting.

Figure 5A:
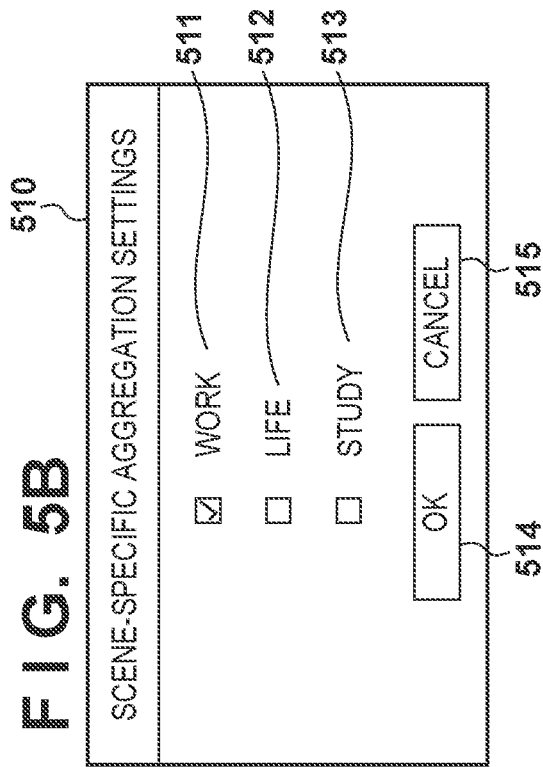
FIGS. 5A to 5D are views for explaining examples of a screen displayed on the operation display.

In step S401, the CPU 101 detects press of the setup button 210 (FIG. 2) of the main body via the operation display 108. Then, in step S402, the CPU 101 displays a main body setup screen 500 (FIG. 5A). The setup screen 500 includes, as buttons for selecting setting items, a print setting button 501, a LAN setting button 502, a scene-specific home screen edit button 503, and a scene-specific aggregation setting button 504.

Figure 5B:
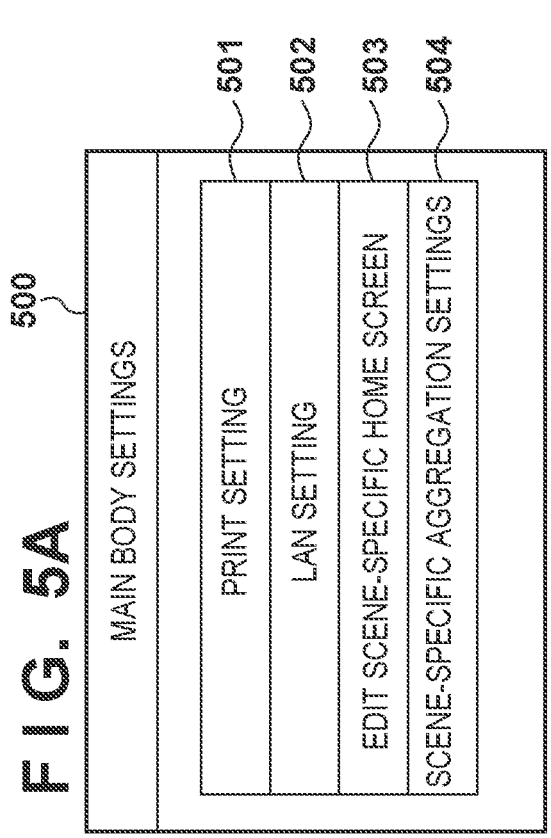

In step S403, the CPU 101 detects press of the scene-specific aggregation setting button 504 via the operation display 108. In step S404, the CPU 101 displays a scene-specific aggregation setting screen 510 (FIG. 5B). The scene-specific aggregation setting screen 510 includes check boxes that prompt selection of use scene names 511 to 513 set at the tabs 202 to 204, an OK button 514 that determines a selection, and a cancel button 515 that cancels a selection.

Figure 5C:
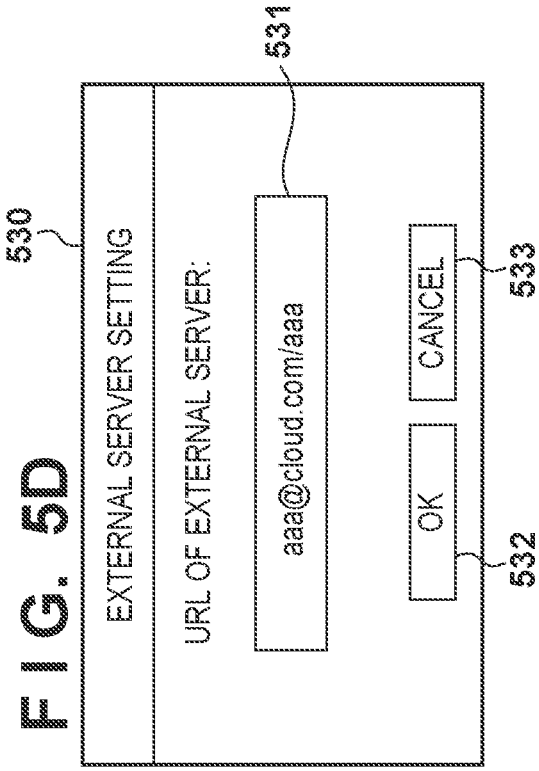
Figure 5D:
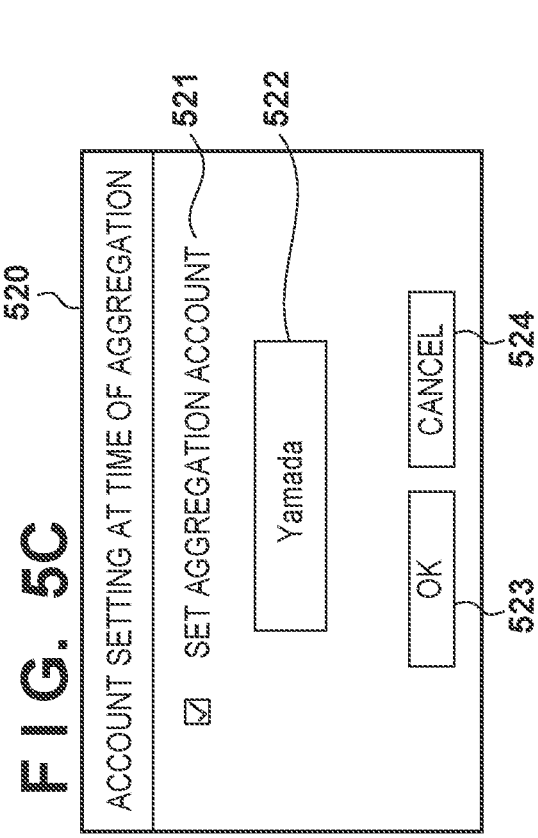

In step S405, the CPU 101 detects selection of an aggregation target use scene via the operation display 108. In step S406, the CPU 101 displays an account setting screen 520 at the time of aggregation (FIG. 5C). For example, based on selection of the OK button 514 in a state in which one of the use scene names 511 to 513 is selected in step S405, the CPU 101 may determine that selection of an aggregation target use scene has been detected. The account setting screen 520 at the time of aggregation includes a check box 521 for selecting whether to set an aggregation account, and an aggregation account input text box 522 that allows input only when the check box 521 is checked. The account setting screen 520 also includes an OK button 523 used to finalize the contents of the check box 521 and text box 522, and a cancel button 524.

In step S407, the CPU 101 checks whether to set an aggregation account, and if YES, advances to step S408; if NO, to step S409. More specifically, when the check box 521 is checked via the operation display 108, an aggregation account is input to the text box 522, and the OK button 523 is pressed, the CPU 101 determines to set an aggregation account, and advances to step S408. In step S408, the CPU 101 detects input of the aggregation account. When the cancel button 524 is selected via the operation display 108, the CPU 101 advances from step S407 to step S409. By the processes in steps S405 to S409, whether to obtain aggregation data (an example of consumption information about consumables) in step S703 (to be described later) can be set for each use scene for which selection can be accepted.

In step S409, the CPU 101 displays an external server setting screen 530. The external server setting screen 530 includes a dialog 531 to which the URL of the external server 150 serving as an aggregation data transmission destination is input, an OK button 532 used to finalize input contents, and a cancel button 533.

In step S410, the CPU 101 detects the input of the dialog 531 and selection of the OK button 532 via the operation display 108, and ends the setting processing. Scene-specific aggregation setting data set in this sequence is saved in the nonvolatile memory 118. That is, the MFP 100 can store, for each use scene, aggregation account information and information about the external server 150 serving as a transmission destination.

<Scene-Specific Aggregation Setting Data (FIG. 6)>

FIG. 6 is a table showing an example of scene-specific aggregation setting data 600 set by the processing of the flowchart shown in FIG. 4. The scene-specific aggregation setting data 600 is stored in, for example, the nonvolatile memory 118. An item 601 represents the name of a use scene. An item 602 represents the identification ID of a scene-assigned tab. An item 603 represents whether aggregation of a print result can be executed. An item 604 represents an aggregation account when creating aggregation data. An item 605 represents the URL of a transmission destination when transmitting aggregation data to the external server 150. In this manner, a tab, the presence/absence of an aggregation setting, an aggregation account, and the URL of an external server are stored in association with each other for each use scene. When executing processing (to be described later), whether aggregation of a print result is executable can be switched for each use scene (for each tab). Also, an external server serving as an aggregation result transmission destination can be changed for each use scene (for each tab).

<Aggregation Data Generation/Transmission Sequence (FIGS. 7 and 8)>

Figure 7:
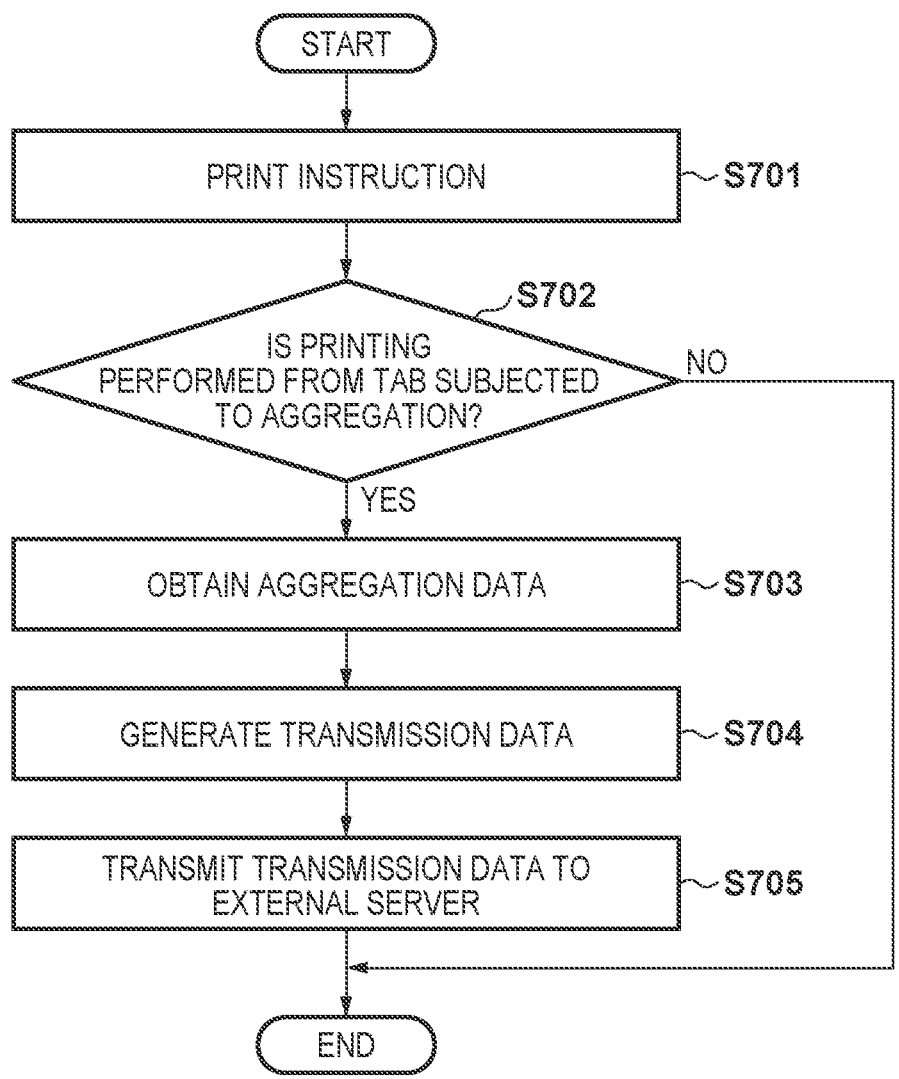
FIG. 7 is a flowchart showing an example of processing of the CPU.

FIG. 7 is a flowchart showing an example of processing of the CPU 101, and shows processing of generation and transmission of aggregation data by the CPU 101 when a print instruction is executed from the operation display 108 of the MFP 100. Note that this processing targets a case where a print instruction is accepted from the operation display 108, and does not target a case where printing is performed by the MFP 100 directly from a PC.

In step S701, the CPU 101 detects a print instruction from a user via the operation display 108. More specifically, the user inputs a print instruction by pressing a predetermined button (for example, the print menu button 207 or the custom menu 303) in a state in which one of the tabs 201 to 204 is pressed. The CPU 101 can accept, as the current use scene of the MFP 100, a use scene corresponding to a tab displayed when the print instruction is input. That is, the CPU 101 selectively accepts the use scene of the MFP 100 based on selection of one of the tabs 201 to 204 by the user. In other words, a use scene is accepted by selecting a display (tab) corresponding to the use scene that is displayed on the operation panel 200 of the operation display 108. Note that when the tab 201 is selected, that is, when a print instruction is executed on the standard home screen, the CPU 101 can determine that no use scene is selected.

In step S702, the CPU 101 checks whether the use scene of the print instruction is subjected to aggregation. If YES in step S702, the CPU 101 advances to step S703; if NO, the flowchart ends. For example, the CPU 101 refers to the scene-specific aggregation setting data 600 saved in the nonvolatile memory 118, and determines whether the user has input a print instruction from the tab of a use scene for which the aggregation setting is "ON" for the print instruction. If the print instruction is input from a tab for which the aggregation setting is "OFF", the CPU 101 ends the processing. If the print instruction is input from a tab for which the aggregation setting is "ON", the CPU 101 advances to step S703.

In step S703, the CPU 101 obtains aggregation data via the printing controller 113. The CPU 101 obtains aggregation data of the result of printing based on the print instruction from the user. For example, the CPU 101 obtains, as the aggregation data, data such as the number of print sheets, the paper size, and color/monochrome. The aggregation data is an example of consumption information of consumables when the printing unit 114 printed. That is, in this step, the CPU 101 obtains consumption information of consumables when the printing unit 114 printed.

In step S704, the CPU 101 generates the transmission data 800 to be generated to the external server 150 by using the aggregation data obtained in step S703. FIG. 8 is a table showing an example of transmission data 800 to be transmitted to the external server 150. An item 801 represents the printing completion date & time, and an item 802 represents an aggregation account set in step S408. An item 803 represents a scene name corresponding to a tab for which printing was executed, an item 804 represents the number of print sheets, an item 805 represents the paper size, and an item 806 represents color printing/monochrome printing. That is, the transmission data 800 is an example of data in which the use scene of the MFP 100 accepted in step S701 and the consumption information of the consumables obtained in step S703 are associated. The external server 150 accumulates the transmission data 800 and can manage information such as the cumulative number of print sheets corresponding to a target account name and scene name.

Referring back to the description of the flowchart of FIG. 7, in step S705, the CPU 101 refers to the scene-specific aggregation setting data 600 saved in the nonvolatile memory 118, transmits the transmission data 800 of the external server 150 serving as a transmission destination specified by the item 605, and ends the processing. Here, the CPU 101 can transmit the transmission data 800 to the external server 150 (external apparatus) serving as a transmission destination corresponding to a use scene by referring to the aggregation setting data 600. Note that the CPU 101 may transmit the transmission data 800 directly to the external server 150 or transmit the transmission data 800 to the external server 150 via a PC or the like within the LAN network. The external server 150 stores the received transmission data 800 in, for example, the HDD 154.

If the transmission fails, retry is repeated several times. If the transmission fails even so, the transmission data 800 is accumulated and transmitted together at the time of next transmission.

<Presentation of Aggregation Data (FIGS. 10A and 10B)>

FIG. 10A shows an example when aggregation data is presented based on the transmission data 800 transmitted to the external server 150 according to the flowchart of FIG. 7. For example, when the external server 150 receives an aggregation data presentation request via the input device 155, another PC, or the like, it presents aggregation data shown in FIG. 10A. The aggregation data may be displayed on the display device 156 of the external server 150. Alternatively, when an aggregation data request is issued from another PC or the like to the external server 150, information for displaying the aggregation data may be transmitted from the external server 150 to the other PC or the like.

Information including the printing date & time, the account name, the scene name, the number of print sheets, the paper size, and color/monochrome is associated with each ID and presented. In addition, information of a transmission source apparatus (for example, information unique to an apparatus such as MAC address) may be associated. Here, aggregation data of three accounts are presented. By presenting the aggregation data in this way, the use status of the printing apparatus can be grasped easily in time series.

FIG. 10B shows an example when aggregation data is presented based on the transmission data 800 accumulated in the external server 150. In this case, information including the account name, the scene name, the number of print sheets, the paper size, and color/monochrome is associated with each ID and displayed. Also, the total amount of use of the MFP 100 by each account in a predetermined aggregation period is presented. For example, data of ID 21 is the sum of the numbers of print sheets in ID 11 and ID 13 in FIG. 10A. By aggregating data in this manner, the use status of the printing apparatus for each account in a predetermined aggregation period can be grasped easily.

As described above, according to the embodiment, data in which a use scene and consumption information about the consumables of the MFP 100 are associated is generated, and the use status of the MFP 100 can be grasped more properly.

According to the embodiment, when printing is performed from a tab subjected to aggregation, that is, in a use scene for which it is set to obtain aggregation data as an example of consumption information, aggregation data is obtained (S702: YES→S703). Since obtainment of data and transmission to an external apparatus are performed only for a use scene requiring aggregation, the processing load of the MFP 100 can be reduced.

Figure 9A:
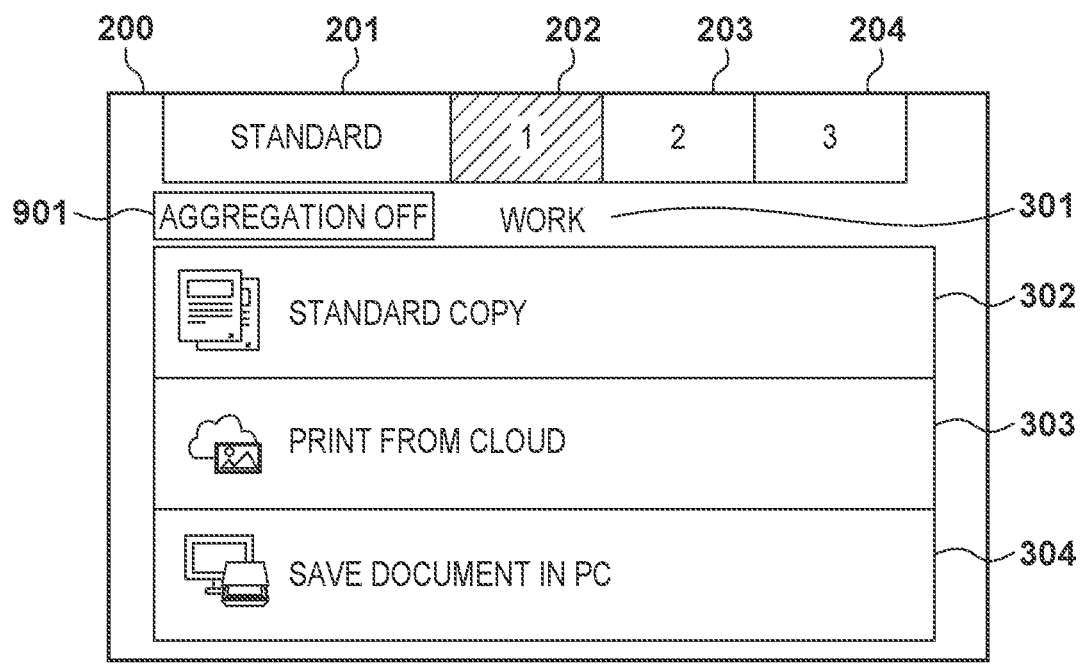
FIGS. 9A and 9B are views showing an example of a screen displayed on the operation display.
Figure 9B:
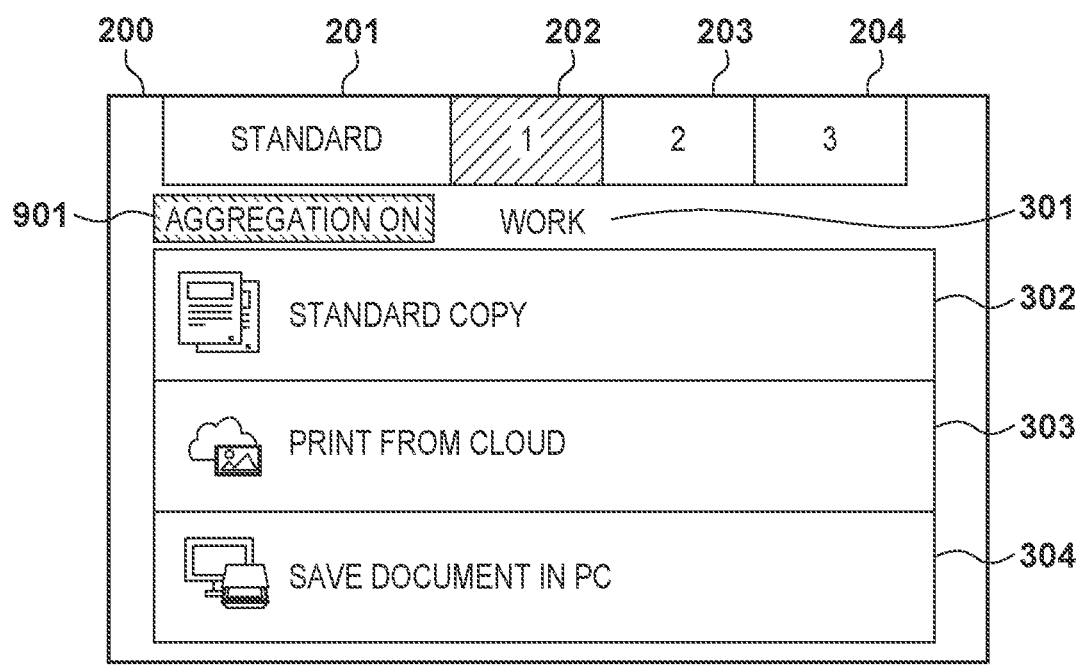

Second Embodiment (FIGS. 9A and 9B)

In the aggregation data generation processing according to the first embodiment, scene-specific aggregation setting needs to be performed in advance for a tab. In the second embodiment, processing of performing aggregation at the time of printing will be explained with reference to FIGS. 9A and 9B.

FIGS. 9A and 9B are views showing a custom home screen of tab 1 displayed on an operation display 108 to set execution of aggregation at the time of printing. The custom home screen is similar to that in FIG. 3A except an aggregation ON/OFF button 901. The aggregation ON/OFF button 901 can be pressed to switch setting of whether to perform (aggregation ON) or not to perform (aggregation OFF) aggregation of immediately succeeding print processing. That is, the user presses the aggregation ON/OFF button 901 to set a state "aggregation ON" so that aggregation of immediately succeeding print processing can be performed even without performing scene-specific aggregation setting for a tab in advance. In the embodiment, the aggregation ON/OFF button 901 is displayed on an operation panel 200 together with custom menus 302 to 304. That is, the aggregation ON/OFF button 901 serving as an example of a switch capable of switching whether to obtain aggregation data for a corresponding use scene is displayed on the operation panel 200 together with the custom menu 303 serving as an example of an instruction acceptance unit for accepting a print instruction. The user can switch ON/OFF of obtainment of data by a simple operation immediately before a print instruction.

<Modification>

In the first embodiment, an example in which the MFP 100 transmits transmission data to the external server 150 immediately after print processing has been described. However, the MFP 100 may transmit aggregation data altogether at a timing except print processing. For example, the MFP 100 may transmit aggregation data altogether in a predetermined cycle, or transmit aggregation data altogether at a timing when a connection with the external server 150 by the communication controller 110 is established.

Further, in the first embodiment, an example in which a tab subjected to aggregation is set as scene-specific aggregation setting processing has been described. However, a tab or print processing not subjected to aggregation may be designated. For example, even when a tab subjected to aggregation is selected, it may be set not to perform aggregation for print processing at the time of maintenance executed by the administrator or serviceman of the MFP 100 or the like.

In the first embodiment, an example in which printing from the "WORK" tab 202 as printing for work is aggregated as scene-specific aggregation setting processing has been described. However, a plurality of tabs such as "WORK 1" and "WORK 2" may be set as the tab for work. In such a case, it may be set to perform aggregation of "WORK 1" and "WORK 2" at once as "WORK". That is, a use scene may be set to have a hierarchical structure. The transmission data 800 in which pieces of consumption information of a plurality of use scenes are compiled may be generated. The data in which pieces of consumption information of a plurality of use scenes are compiled may be generated by aggregating data received by the external server 150 from the MFP 100.

In the first embodiment, the external server 150 may aggregate the transmission data 800 into one file for each account name or each scene name periodically (for example, every month), and save it in the HDD 154. The aggregation result may be presented in response to a request from another apparatus.

The generated transmission data 800 is transmitted to the external server 150 in the first embodiment, but a configuration in which an aggregation result for each use scene is managed by the MFP 100 and displayed on the operation display 108 can also be adopted. For example, after data equivalent to the transmission data 800 is generated (step S704), the generated data may be not transmitted to the external server 150 (step S705), but stored in the nonvolatile memory 118 or the like. A button such as "check aggregation result" may be provided on the setup screen 500, and when this button is selected, an aggregation result for each use scene may be displayed on the operation panel 200.

In the first embodiment, an example in which only when a print instruction from an aggregation target tab is received, the transmission data 800 is transmitted to the external server 150 has been described. However, the MFP 100 may generate transmission data for all tabs (use scenes) and transmit them to the external server 150, and the external server 150 may store only necessary data.

In the first embodiment, the number of print media used has been exemplified as consumption information of consumables when the printing unit 114 printed. Another example of consumption information of consumables is the amount of consumption of printing material such as ink or toner. In this case, the transmission data 800 shown in FIG. 8 may include information such as the number of dots of ink of each color or the amount (ml) of consumption.

Alternatively, consumption information of consumables may be the amount of money converted from the consumption state of consumables. For example, the amount of money per print medium or the amount of money per ink dot may be set in advance, and the amount of money calculated based on a print result may be used as consumption information.

Also, the operation settings of the MFP 100 may be properly changed in accordance with a selected use scene. For example, a printing operation in the use scene "WORK" may be set to be silent, compared to a printing operation in the use scene "LIFE". For example, the silence in the use scene "WORK" may be relatively enhanced by setting a printing speed in the use scene "WORK" to be lower than a printing speed in the use scene "LIFE". Whether to perform the silent operation may be set from the setup screen 500. For example, a button "scene-specific silent setting" may be provided on the setup screen 500 so that when this button is selected, ON/OFF of the silent setting for each use scene can be selected.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-136235, filed Aug. 29, 2022, which is hereby incorporated by reference herein in its entirety.

What is claimed is:

1. A printing apparatus comprising:
   at least one memory storing instructions; and
   at least one processor that executes the instructions to:
      selectively accept a use scene of the printing apparatus;
      set whether to obtain consumption information of a consumable for each acceptable use scene;
      obtain the consumption information for the selectively accepted use scene, in a state where the selectively accepted use scene has been set to obtain the consumption information; and
      generate data that associates the selectively accepted use scene and the obtained consumption information.

2. The apparatus according to claim 1, further comprising communication controller configured to transmit the generated data to an external apparatus.

3. The apparatus according to claim 2, wherein the communication controller transmits the data to the external apparatus, which serves as a transmission destination corresponding the use scene.

4. The apparatus according to claim 1, wherein the consumption information is information about the number of print media used.

5. The apparatus according to claim 1, wherein the at least one processor:
   controls displaying of a display device of the printing apparatus, and
   selectively accepts the use scene by selecting display corresponding to the use scene that is displayed on the display-device.

6. The apparatus according to claim 5, wherein the at least one processor:
   selectively displays, on the display device, a plurality of tabs corresponding to acceptable use scenes, and
   accepts selection of the use scene corresponding to a selected tab in accordance with selection of one of the plurality of tabs.

7. The apparatus according to claim 6, wherein the at least one processor controls the display device to concurrently display, on the display device:
   a user instruction interface for accepting a print instruction; and
   a switching interface that allows a user to set whether to obtain the consumption information.

8. The apparatus according to claim 5, wherein the at least one processor controls the display device to display, on the display device, a menu different for each use scene.

9. The apparatus according to claim 1, wherein the generated data further associates aggregation account information of the consumption information.

10. The apparatus according to claim 1, the at least one processor changes an operation setting of the printing apparatus in accordance with the selectively accepted use scene.

11. The apparatus according to claim 1, wherein the at least one processor further generates data that compiles pieces of the consumption information of a plurality of use scenes.

12. The apparatus according to claim 1, wherein, even in a state where the consumption information has been set to be obtained, the at least one processor does not obtain the consumption information in executing a predetermined processing.

13. A non-transitory computer-readable storage medium storing a program executable by a computer to execute a method comprising:
   selectively accepting a use scene of a printing apparatus;
   setting whether to obtain consumption information of a consumable for each acceptable use scene;
   obtaining the consumption information for the selectively accepted use scene, in a state where the selectively accepted use scene has been set to obtain the consumption information; and
   generating data that associates the selectively accepted use scene and the obtained consumption information.

14. A data generation method comprising:
   selectively accepting a use scene of a printing apparatus;
   setting whether to obtain consumption information of a consumable for each acceptable use scene;
   obtaining the consumption information for the selectively accepted use scene, in a state where the selectively accepted use scene has been set to obtain the consumption information; and
   generating data that associates the selectively accepted use scene and the obtained consumption information.

* * * * *